United States Patent Office 2,758,053
Patented Aug. 7, 1956

2,758,053

METHOD OF CONTROLLING FUNGI ON PLANTS AND SEEDS WITH BENZOYL PHENYL HYDRAZINES

Allen E. Smith, Oxford, George E. O'Brien, Bethany, and Adelaide Bornmann, New Haven, Conn., assignors to United States Rubber Company, New York, N. Y., a corporation of New Jersey No Drawing. Application March 17, 1953,
Serial No. 342,981

2 Claims. (Cl. 167—30)

This invention relates to new and useful improvements in fungicides. The invention further relates to methods of treating growing plants, and to methods of protecting organic material subject to attack by microorganisms, as the immunizing of seed.

We have found that 1-benzoyl-2-phenylhydrazine, 1-(2-chlorobenzoyl)-2-phenylhydrazine, and 1-(2,4-dichlorobenzoyl) 2-phenylhydrazine are effective fungicides.

The chemicals of the present invention may be used as seed protectants and disinfectants, and to protect growing plants from fungus infection. They may be applied to seeds and plants directly, or in an inert medium as a dust in admixture with a powdered solid carrier, such as the various mineral silicates, e. g., mica, talc, pyrophyllite and clays. They may be applied as aqueous sprays in suspension in water. They may be applied in admixture with small amounts of a surface-active agent which may be an anionic surface-active agent, a non-ionic surface-active agent, or a cationic surface-active agent, and which acts as a wetting agent for the chemical. Such surface-active agents are well known and reference is made to U. S. Patent 2,547,724, columns 3 and 4, for more detailed examples of the same. They may be applied as in foliage treatment in an aqueous suspension containing such a surface-active agent as a dispersing agent. The chemicals of the invention may also be admixed with powdered solid carriers, such as mineral silicates, together with a small amount of such a surface-active agent so that a wettable powder may be obtained which may be applied directly to plants, or which may be shaken up with water to readily prepare a suspension of the chemical (and powdered carrier) in water for application to plants in that form. The chemicals may be applied to plants by the aerosol method.

The chemicals of the present invention may be made by reacting equal molar amounts of phenylhydrazine and a halide, anhydride or ester of benzoic acid or 2-chlorobenzoic acid or 2,4-dichlorobenzoic acid. For example, 1-(2-chlorobenzoyl)-2-phenylhydrazine may be prepared as follows:

Twenty-one and six-tenths grams of phenylhydrazine (.2 mol) and 16.6 grams pyridine were added to 100 ml. of benzene in a flask equipped with a stirrer and a dropping funnel. Thirty-five grams of o-chlorobenzoyl chloride (.2 mol) were added gradually with stirring over a period of seven minutes. After stirring an additional 15 minutes, 100 ml. of water was added to dissolve the pyridine hydrochloride. A tan solid separated. It was collected and washed with a sodium bicarbonate solution, and then with water and air-dried. Yield; 38 grams (77.5%), M. P. 147–150° C.

The effectiveness of the chemicals of the invention as fungicides is illustrated in the following examples:

The chemicals to be tested were ground with 7.5% by weight of the chemical of an alkyl phenoxy polyoxyethylene ethanol (monoether of a polyglycol with an alkylated phenol) which is a surface-active agent known to possess no fungicidal properties in the amount used. The mixture of surface-active agent and test chemical was dispersed by agitating in distilled water at a concentration of 2000 parts per million of the chemical.

Duplicate six-inch tomato plants of the variety Bonny Best were sprayed for 20 seconds at 20 pounds pressure with the thus prepared aqueous suspension of each fungicide. After the spray deposit was thoroughly dry (24 hours), the plants and four comparable untreated (check) plants were sprayed with an aqueous suspension of spores of the early blight fungus (*Alternaria solani*). The plants were held for 24 hours at 21° C. and 100 percent relative humidity to permit spore germination and host infection before removing the plants to the greenhouse. Records were taken five days later on the number of lesions produced on the fifteen major leaflets of the three youngest fully expanded leaves. These data were converted to percentage of control on the basis of the average number of fungus lesions on the four check plants.

The percent fungus control by the various chemicals of the invention is shown in the following table:

| Treatment Chemical | Percent Fungus Control |
|---|---|
| 1-benzoyl-2-phenylhydrazine | 85 |
| 1-(2-chlorobenzoyl)-2-phenylhydrazine | 99 |

Example II

The fungicide to be tested was finely ground and applied dry at the rate of 3 ounces of fungicide to 100 lbs. of corn seed. Distribution of the fungicide on seed surface was accomplished by tumbling seed plus fungicide for 30 minutes on a seed treatment wheel. Using a planned randomization scheme 8 replicates of 25 seeds each were then planted in flats containing naturally contaminated soil. They were placed in a cold chamber and maintained at 50° F. and 100 percent relative humidity for fourteen days. After removal from the cold chamber, the flats were placed in the green house to complete emergence. Stand counts were made after 7 to 10 days.

The stand from seeds treated with 1-benzoyl-2-phenylhydrazine and with 1-(2-chlorobenzoyl)-2-phenylhydrazine was 96 percent and 92 percent, respectively, whereas the stand of untreated (control) seeds was 60 percent.

Having thus described our invention, what we claim and desire to protect by Letters Patent is:

1. The method of controlling fungi on plants and seeds which comprises contacting fungi on plants and seeds with a fungicidal amount of 1-(2-chlorobenzoyl)-2-phenylhydrazine.

2. The method of controlling fungi on plants and seeds which comprises contacting fungi on plants and seeds with a fungicidal amount of material selected from the group consisting of 1-benzoyl-2-phenylhydrazine, 1-(2-chlorobenzoyl)-2-phenylhydrazine, and 1-(2,4-dichlorobenzoyl)-2-phenylhydrazine.

References Cited in the file of this patent

FOREIGN PATENTS 460,521    Great Britain _____ 1937

OTHER REFERENCES

Siegler et al.: Journal of Economic Entomology, vol. 39, No. 3, June 1946, pages 416, 417.

Frear, D. E. H.: Chemistry of Insecticides, Fungicides and Herbicides, 2nd ed., Sept. 1948, pages 108–122.